May 4, 1926.
J. S. DENNY
1,583,282
AUTOMATIC PUMP CONTROL
Filed April 12, 1923
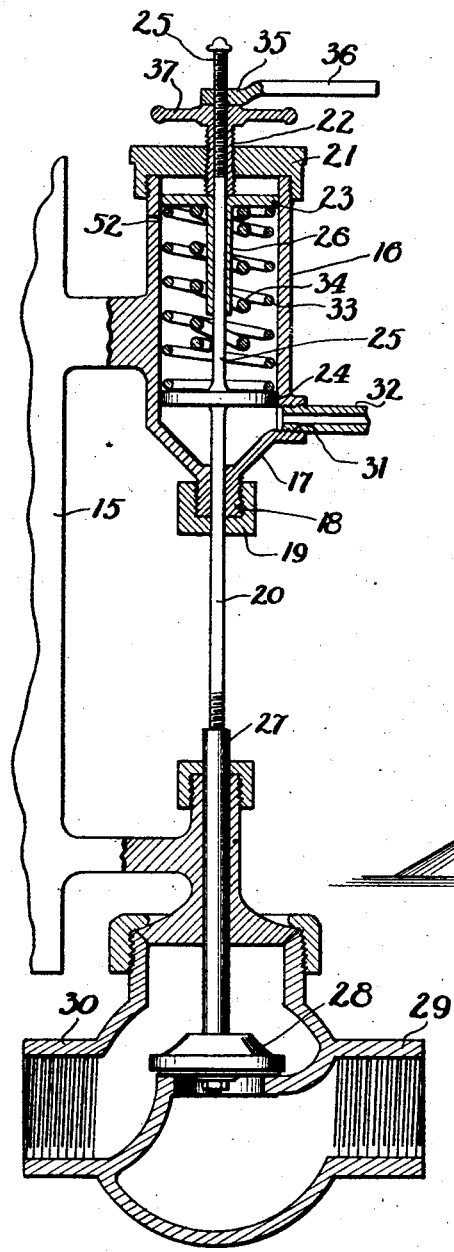
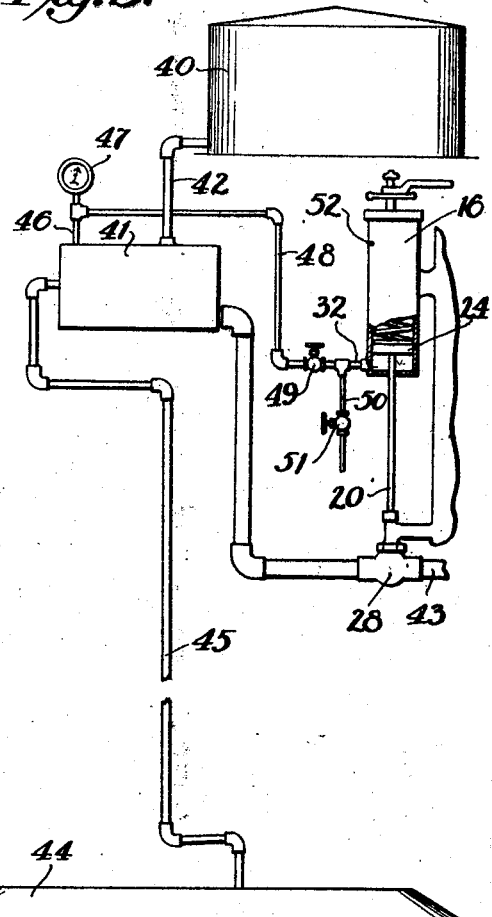
Inventor
John S. Denny
by Hazard and Miller
Attys Patented May 4, 1926.

1,583,282

UNITED STATES PATENT OFFICE.

JOHN S. DENNY, OF LONG BEACH, CALIFORNIA.

AUTOMATIC PUMP CONTROL.

Application filed April 12, 1923. Serial No. 631,561.

*To all whom it may concern:*

Be it known that I, JOHN S. DENNY, a citizen of the United States, residing at Long Beach, in the county of Los Angeles and State of California, have invented new and useful Improvements in Automatic Pump Controls, of which the following is a specification.

My invention relates to oil conveying systems of that character including a multiplicity of pumps for forcing oil through a pipe-line to a remote storage tank. In systems of this character the oil pressure set up in the oil line frequently causes the oil line to break so that with the oil pressure in the line materially reduced the pumps are free to continue operation and at a much increased speed thereby destroying the pumps and wasting the oil.

It is a purpose of my invention to provide an automatic control for the pumps which operates in such manner that when a break occurs in the oil line, the pumps immediately cease to operate or are reduced to such low speed as to prevent self-destruction. Furthermore, my invention contemplates the provision of an automatic control which varies the speed of the pumps in accordance with the existing oil pressure in the oil line so that as the oil pressure is increased or decreased the speed of the pump will be likewise increased or decreased.

Although I have herein shown and will describe only one oil conveying system and one form of automatic control embodying my invention it is to be understood that various changes and modifications may be made herein without departing from the spirit of the invention and the spirit and scope of the appended claims.

In the accompanying drawings,

Figure 1 is a view showing in vertical section one form of automatic control embodying my invention.

Fig. 2 is a view somewhat diagrammatic showing an oil conveying system having applied thereto the automatic control shown in Fig. 1.

Referring specifically to the drawing in which similar reference characters refer to similar parts, my invention in its present embodiment comprises a support 15 upon which is sustained a cylinder 16 having a conical lower end 17 provided with a threaded nipple 18 engaged by a cap 19, the nipple and cap being provided with registering openings through which a piston rod 20 is adapted to slide. The upper end of the cylinder is open but normally closed by a cap 21 formed axially with a threaded aperture. An exteriorally threaded tubular member 22 is threaded through the cap 21 and abuts against the head 23. The internal bore of the member 22 is smooth to allow movement of the rod 25. The rod 20 is provided at its upper end with a piston 24, slidable in the cylinder 16 and rigidly connected to a rod 25 which extends loosely through a sleeve 26 preferably formed integral with, and depending from the head 23. The lower end of the rod 20 has threaded engagement with the stem 27 of a globe valve 28, the casing of the valve 28 being provided with nipples 29 and 30 for connection with pipes as will hereinafter be described.

The cylinder 16 is provided adjacent its lower end with an inlet port 31 adapted for connection with a pipe 32 so as to supply oil under pressure to the cylinder at a point beneath the piston 24. Upward movement of the piston 24 is opposed by springs 33 and 34 arranged between the piston 24 and the head 23 in the manner clearly shown in Fig. 1. As here shown, the springs are of spiral form, with the outer spring 33 exceeding in length that of the spring 34 but of less tension than the latter so that the resistance offered to the piston 24 during the first part of its upward movement is relatively slight as compared to the resistance offered by the combined action of the springs 33 and 34 during the remainder of the upward movement of the piston 24.

The rod 25 extends through the extension 22 and projects therefrom where it is threaded so as to be engaged by a nut 35 provided with a handle 36. This nut 35 is adapted to engage a wheel 37 fixed on the upper end of the tubular member 22 so that rotation of the nut in one direction or the other will effect a longitudinal adjustment of the rod 25.

Referring now to Fig. 2, I have here shown a conventional form of oil conveying system including an oil receiving tank 40 connected to a fluid operated pump 41 by means of a pipe 42. The pump 41 is, in the present instance, a steam operated pump, and steam is supplied to the pump from a suitable source (not shown) through the medium of a pipe 43. Oil is discharged from the pump 41 and conveyed to a remote storage tank 44 through a pipe 45.

In applying the automatic control to the oil conveying system, the pump 41 is provided at its discharge end with a pipe 46 having a pressure gauge 47. Connected to the pipe 46 is a pipe 48 which serves to conduct oil from the discharge end of the pump to the cylinder 16 through the pipe 32 and the port 31. As shown in Fig. 2, pipe 32 is provided with a valve 49 and with a branch pipe 50 provided with a valve 51. Pipe 50 constitutes a drain for removing oil from the cylinder 16 as will be hereinafter described.

In the applied position of the automatic control, the valve 28 is interposed in the line of the pipe 43 so that the valve serves to control the supply of steam to the pump 41. The valve 28 although normally closed under the action of the spring 33 may be slightly opened through manipulation of the nut 35 thereby moving the rod 25 upwardly and with it the piston 24 and the rod 20. With the valve slightly opened, steam is admitted to the pump 41 so that the latter starts to operate, thus drawing oil from the tank 40 and forcing the oil through the line 45 to the tank 44. As soon as the pump starts to operate an oil pressure is created at its discharge end, and this pressure is conducted to the lower end of the cylinder 16 through the pipes 48 and 32, it being understood that valve 49 is now open. The oil under pressure acts to elevate the piston 24 thereby further opening the valve as the pressure at the discharge end of the pump increases. As the springs 33 and 34 oppose the upward movement of the piston 24, it will be clear that as the oil pressure in the cylinder increases the upward movement of the piston 24 decreases, and that as a consequence the movement of the valve 28 is controlled accordingly. An adjustment of the tension of the springs 33 and 34 may be had through a manipulation of the wheel 37 to move the head 23 upwardly to decrease the tension of the springs and downwardly to increase the tension. It will thus be seen that the movement of the piston 24 may be further controlled through an adjustment of the tension of the springs 33 and 34, and that as these springs lose their tension they may be made to function in the normal manner by a downward adjustment of the head 23.

From the foregoing operation, it will be seen that according as the oil pressure is increased or decreased the valve 28 will be opened or closed thus causing the pump at all times to operate in accordance with the pressure of the oil. Should a break occur in the oil line 45, it will be clear that the oil pressure at the discharge end of the pump is materially reduced, and as such a reduction in pressure likewise occurs within the cylinder 16, the springs are now free to move the piston downwardly so as to completely close or partly close the valve 28. Under this action the supply of steam to the pump 41 is partly or completely cut off thereby materially reducing the speed of the pump or bringing it to a standstill.

Should it be desired to discontinue the operation of the pump for any reason whatsoever, the piston 24 may be relieved of the oil pressure by closing the valve 49 and opening the valve 51 thereby permitting the oil to discharge from the cylinder through the pipe 50 and thus allowing the piston 24 to be lowered to close the valve 28. Should oil manage to pass to the upper side of the piston 24, it can be expelled from the piston through a drain opening 52.

From a consideration of Fig. 1, it will be seen that the sleeve 26 serves to limit the upward movement of the piston 24 so as to prevent undue compression of the springs 33 and 34 and to limit the opening of the valve 28 to prevent distortion or breaking of the valve and valve stem.

What I claim is:

1. An automatic control for pumps or the like, comprising in combination a valve to be controlled, a cylinder, a piston chamber, a piston therein operably connected to the valve, a fluid inlet to the piston chamber, a head in the cylinder having an integral sleeve extending towards the piston to limit the movement thereof, a spring between the head and the piston, a cap on the cylinder, a threaded tubular member passing through the cap, a rod connected to the piston and passing through the head and tubular member, screw threads on the end of said rod, a nut engaging said screw threads and bearing against said tubular member, an inlet pipe connected to the inlet to the piston chamber, having a valve, a drain pipe attached to the inlet pipe between the cylinder and the inlet pipe valve, and a discharge valve in the discharge pipe.

2. An automatic control for pumps or the like comprising in combination a valve to be controlled, a cylinder, a piston chamber, an inlet to the piston chamber, a piston in the piston chamber, a piston rod connected to the valve, a head in the cylinder having an integral sleeve said sleeve extending towards the piston to limit the movement thereof, a cap on the cylinder having a threaded aperture, a tubular threaded member threaded therethrough having integral means to screw the tubular member in and out of the cap, said tubular member bearing against the head but detached therefrom, a spring between the piston and the head thrusting the head against the tubular member, a rod connected to the piston and slidable through the sleeve, head and tubular member, screw threads on the end of said rod, and a nut on said screw threads adapted to bear against the tubular threaded member an inlet pipe having a valve attached to the inlet to the piston chamber, a discharge pipe connected between said valve and the cylinder, and a discharge valve in the discharge pipe connected to the inlet pipe between the said valve and the cylinder and a discharge valve in the discharge pipe.

In testimony whereof I have signed my name to this specification.

JOHN S. DENNY.